United States Patent Office 3,304,152
Patented Feb. 14, 1967

3,304,152
METHOD FOR DIRECTLY PREPARING GRANULAR URANIFEROUS MATERIAL HAVING DEFINITE PARTICLE SIZE
Marie E. A. Hermans and Theo van der Plas, Arnhem, Netherlands, assignors to Reactor Centrum Nederland, The Hague, Netherlands, an institute of the Netherlands
No Drawing. Filed May 19, 1964, Ser. No. 368,734
4 Claims. (Cl. 23—34.6)

Our co-pending application Serial No. 813,053 now Patent Number 3,097,062 deals with a method for preparing granular uraniferous material having definite uniform particle size. This method comprises agitating a seed-free hot aqueous solution, containing about 0.2 to 0.6 gram ions of uranyl ions per liter together with nitrate ions and urea, to bring about after some time a slowly proceeding homogeneous precipitation, quickly separating the solids from the liquid when still hot and, if required, reducing said solids with hydrogen. The solids are individually sintered in a water containing hydrogen atmosphere and the process is characterized by adjusting the initial urea concentration between about 110 and about 200 g./l., maintaining the temperature of the reaction medium below 100° C. and homogenizing the mixture at least during the precipitation.

This method enables one to obtain amorphous particles having definite particle size between narrow limits. According to the example of the above referred to application the particle size has a value of about $13\mu$ (prior to sintering) or about $9\mu$ (after sintering) respectively.

It has been found in practice that difficulties arise on increasing the stirring intensity in said method in order to obtain particles of still smaller particle size, because instead of an amorphous product a crystalline precipitate occurs. This crystalline precipitate is absolutely undesirable.

An object of the invention is to improve the method according to application Serial No. 813,053 now Patent Number 3,097,062 in such a way that the occurrence of a crystalline precipitate from the liquid is prevented, irrespective of the agitating intensity. Surprisingly, it has been found that this object may be achieved by performing the agitation under an overpressure of carbon dioxide.

Thus the improvement according to the invention consists in performing the agitating process under an atmosphere of gaseous carbon dioxide having a pressure of a head of water of about 2 meters.

Though in fact the application of a carbon dioxide atmosphere would only be necessary at very high agitating intensities a carbon dioxide atmosphere is in practice almost always applied as the critical value of the agitating intensity, defining the formation of a crystalline precipitate, is different from each individual case. The determination thereof is very laborious and uneconomical.

This critical value proved to be dependent on a number of factors, such as the amplitude of the vibrating plate agitator, the dimensions of that agitator, the dimensions and shape of the reaction vessel, the amount of liquid and the values of the urea concentration and of the nitrate ions concentration. Therefore it is advisable always to use a carbon dioxide atmosphere.

Example

One liter of aqueous uranyl nitrate solution, containing per liter 0.40 gram ions of uranyl ions and 1.32 equivalents of nitrate, is partially neutralized with 50 cc. of 25% aqueous ammonia. The solution obtained is filtered to make it seed-free and thereafter heated to 92°±2° C. in a 3 liter flask. While maintaining said temperature 500 cc. of filtered aqueous urea solution containing 500 g./l. of urea is added. The resulting mixture containing per liter 0.27 gram ions of uranyl ions and 167 g. of urea, is thoroughly agitated under an atmosphere of gaseous carbon dioxide having a pressure of a head of water of about 2 meters, using a vibrating plate agitator (commonly known as "Vibromixer"), its vibrating plate having a diameter of 64 mm. and operating at an amplitude of 2.2 mm. and at a frequency of 100 Hz. After 20 to 40 minutes the formation of an orange-yellow colored solid starts by homogeneous precipitation, which is completed in about 90 minutes. The solids are quickly separated from the liquid when still hot, washed with water and dried with acetone. The particle size distribution of the thus obtained non-crystalline solids shows a sharp maximum at $8\mu$ having a maximum standard deviation of $1.2\mu$.

The solids are reduced in a hydrogen atmosphere at 1000°–1200° C. for 20 minutes and then sintered individually at a temperature of about 1700° C. in a hydrogen atmosphere containing about 30% of water vapor.

The uranium dioxide thus obtained has a particle size distribution having a sharp maximum at about $5\mu$ and shows the same particle characteristic curve as the original product, moreover it exhibits a small specific surface (about 0.2 m.$^2$/g.). This material would be extremely suitable as fissionable material in a suspension or slurry nuclear reactor having a continuous purification during operation.

A crystalline product is obtained if the above method is performed with the only modification that no carbon dioxide atmosphere is applied.

What is claimed is:
1. A method for directly preparing granular uraniferous material of definite uniform particle size, comprising the following steps: thoroughly agitating a seed-free hot aqueous solution containing an amount of the order of 0.2 to 0.6 gram ions of uranyl ions per liter in the presence of nitrate ions and urea having a concentration lying in the range from 110 to 200 grams per liter said agitating being performed under an atmosphere of gaseous carbon dioxide having a pressure of a head of water of substantially 2 meters, maintaining the temperature of the solution below 100° C., said agitating serving to bring about after some time a slowly proceeding homogeneous precipitation, quickly separating the solids from the liquid when still hot and sintering the individual solid particles in a water containing hydrogen atmosphere.

2. A method according to claim 1 wherein the concentration of the uranyl ions is 0.4 grams ions per liter.

3. A method for directly preparing granular uraniferous material of definite uniform particle size, comprising the following steps: thoroughly agitating the seed-free hot aqueous solution containing an amount of the order of 0.2 to 0.6 gram ions of uranyl ions per liter in the presence of nitrate ions and urea having a concentration lying in the range from 110 to 200 grams per liter, said agitating being performed under an atmosphere of gaseous carbon dioxide having a pressure of a head of water of substantially 2 meters, maintaining the temperature of the solution below 100° C., said agitating serving to bring about after some time a slowly proceeding homogeneous precipitation, quickly separating the solids from the liquid when still hot, reducing said solids with hydrogen and sintering the individual solid particles in a water containing hydrogen atmosphere.

4. A method according to claim 3 wherein the concentration of the uranyl ions is 0.4 gram ions per liter.

References Cited by the Examiner
UNITED STATES PATENTS
3,097,062   7/1963   Hermans et al. _____ 23—14.5

CARL D. QUARFORTH, *Primary Examiner.*
BENJAMIN R. PADGETT, *Examiner.*
S. TRAUB, *Assistant Examiner.*